United States Patent [19]

De La Torre

[11] Patent Number: 4,923,737
[45] Date of Patent: May 8, 1990

[54] SURFACE MODIFIED PLASTIC AND COMPOSITE ARTICLES AND METHOD

[75] Inventor: William De La Torre, Whittier, Calif.

[73] Assignee: Northrop Corporation, Hawthorne, Calif.

[21] Appl. No.: 260,440

[22] Filed: Oct. 20, 1988

[51] Int. Cl.⁵ .......................... B29C 45/14; B29D 9/00; B32B 3/26; B32B 5/14; B32B 5/16

[52] U.S. Cl. ..................... 428/217; 264/300; 264/320; 264/328.2; 264/328.14; 264/328.18; 428/297; 428/323; 428/418; 428/422; 428/458; 428/461; 428/473.5; 428/698

[58] Field of Search ...................... 264/300, 320, 328.2, 264/328.14, 328.18; 428/217, 323, 418, 422, 458, 461, 473.5, 698

[56] References Cited

U.S. PATENT DOCUMENTS

| 3,030,248 | 4/1962 | Runton | 428/422 |
| 3,389,749 | 6/1968 | Towns et al. | 428/422 |
| 3,708,387 | 1/1973 | Turner et al. | 428/461 |
| 3,950,599 | 4/1976 | Board et al. | 428/422 |
| 4,124,676 | 11/1978 | Henzyl | 428/422 |
| 4,147,824 | 4/1979 | Dettman et al. | 428/422 |
| 4,194,040 | 3/1980 | Breton et al. | 428/422 |
| 4,208,472 | 6/1980 | Cho et al. | 428/422 |
| 4,292,919 | 10/1981 | Taylor | 428/422 |
| 4,517,247 | 5/1985 | Suzuki et al. | 428/422 |
| 4,624,860 | 11/1986 | Alver et al. | 427/46 |

Primary Examiner—James C. Cannon
Attorney, Agent, or Firm—Terry J. Anderson; Robert B. Block

[57] ABSTRACT

A method of forming a metal-containing surface on a fiber-reinforced composite plastic article is disclosed. The method entails using a "metal cloth" which is prepared from fibrillated polytetrafluorethylene containing metal or other particles entrapped in the fibrils. The resultant molded or laminated shaped articles exhibit improved wear resistance and other properties due to the integration and encapsulation of the metal cloth into the plastic surface.

32 Claims, 1 Drawing Sheet

SURFACE MODIFIED PLASTIC AND COMPOSITE ARTICLES AND METHOD

BACKGROUND OF THE INVENTION

The present invention relates to a method of improving the wear resistance and other properties of a non-metallic, i.e. plastic, article by forming a metal-filled-resin composite surface thereon. More particularly the invention relates to forming a metal-filled-resin composite surface on a fiber-reinforced plastic composite shaped article by adhering thereto a "metal cloth" which is a formed fibrillated polymer containing entrapped metal or other particles in the fibrils.

Plastic composites have been known for several years. However this use has not been accepted in many applications due to unacceptably excessive wear, lack of electrical conductivity, poor environmental resistance in certain cases and other such problems. The art is replete with attempts at modifying such composites by incorporating metals or other materials therein to overcome these and other limitations. For example, U.S. Pat. No. 3,708,387 discloses metallic modified plastic compositions prepared by blending polymer particles with metal particles and then compacting the mixture in a cavity mold which results in an essentially uniform metal distribution throughout the polymer phase. U.S. Pat. No. 4,278,729 discloses the production of carbon fiber-tantalum carbide composites by vacuum infiltration of three-dimensional graphite yarn preforms by metal salt solutions. U.S. Pat. No. 3,211,584 discloses a radar antenna wherein a liquid epoxy resin is coated onto an antenna structure and then relatively coarse electrically conductive metallic power is dusted onto the liquid epoxy surface and adheres thereto. U.S. Pat. No. 3,726,737 discloses a method for producing multi-layer thin films of silicon carbide materials by taking cellulosic sheets, impregnating with a resinous material, carbonizing and then silicon-carbonizing the resultant structure. U.S. Pat. No. 2,689,380 discloses a method of making polytetrafluorethylene-containing bearings by applying the polymer in powder or sheet form onto the surface of a porous metallic structure produced by sintering metallic powder and then pressing the polymer into the metallic structure. U.S. Pat. No. 3,515,068 discloses embedding a woven wire fabric in a plastic explosive to strengthen and reinforce the explosive.

Metallic coatings have also been deposited upon metallic substrates to provide a hardface having improved wear and/or corrosion properties. Imperial Clevite, Inc., has commercialized a metallic coating under the trade name "Conforma Clad" which adheres the metal in the "metal cloth" utilized in the present invention to metallic substrates by overlaying the "metal cloth" with a brazing alloy and then heating to evaporate the polymer component of the "metal cloth" and to cause the brazing alloy to infiltrate the metal component of the "metal cloth" and thus bind it to the metallic substrate. The process of making the "metal cloth" is disclosed in U.S. Pat. Nos. 3,743,556; 3,778,586; 3,864,124 and 4,194,040 and a method of its use on metal substrates in U.S. Pat. No. 4,624,860. Articles which have been published on the use of "Conforma Clad" to coat metallic substrates include "Conforma Clad ™—A new Process for Customized Coatings" by Manek R. Dustoor in Refractory and Hard Metals, March, 1983, and "New Method of Applying Wear Resistant Coatings" by Dennis E. Shewell in Metal Progress, November 1983.

Accordingly, it is an object of the present invention to provide a means for applying a uniform metal-filled-resin coating on a shaped plastic article.

Another object of this invention is to provide a means for attaching a "metal cloth" to a non-metallic material which would be destroyed by the temperatures required to attach the same cloth to a metallic substrate.

Another object of this invention is to produce a shaped plastic composite article having solely a surface which is a metal-filled-resin composite.

Another object of this invention is to provide a method for modifying the surface properties of a shaped plastic article.

Another object of this invention is to provide a method for forming a shaped plastic composite article and modifying the surface properties thereof in a single molding operation.

These and other objects will become apparent to those skilled in the art from a reading of the following specification and claims.

SUMMARY OF THE INVENTION

The present invention is directed to a process for forming a shaped plastic article having modified surface properties which entails coating a mold or tool for the shaped article to be formed with a mold release means, applying atop the mold release means a metal cloth which comprises fibrillated polytetrafluorethylene having metal or other surface property modifying particles entrapped in the fibrils, placing a thermosetting polymer atop the metal cloth, and then heating the composite structure for a sufficient period of time and at a sufficient temperature and pressure to cause the thermosetting polymer to flow into interstices in the metal cloth and cure to form the shaped composite article having the imparted surface properties.

The invention is also directed to the formation of a metallic-filled-resin composite surface on a shaped fiber reinforced plastic composite article by coating a mold or tool with mold release means, applying atop the mold release means a metal cloth which comprises fibrillated polytetrafluorethylene having metal particles entrapped in the fibrils, placing a prepreg atop the metal cloth, and then heating the composite structure for a sufficient period of time and at a sufficient temperature and pressure to cause the thermosetting polymer to flow into interstices in the metal cloth to form the shaped article having a metallic-filled-resin composite surface.

DESCRIPTION OF THE PREFERRED EMBODIMENT

Figure 1:
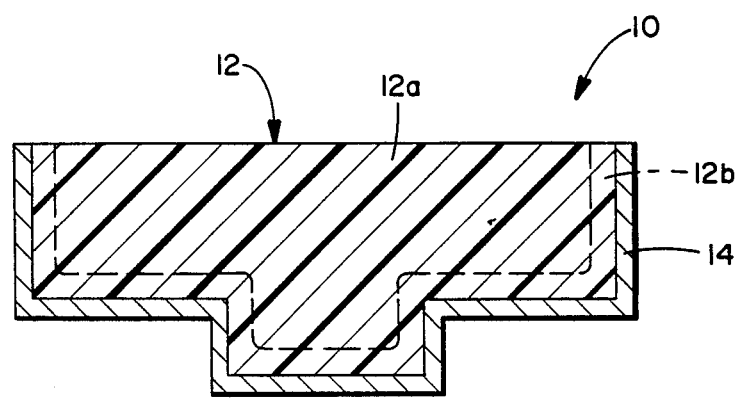
FIG. 1 is a cross-sectional view showing alternative articles produced by the present process.
Figure 2:
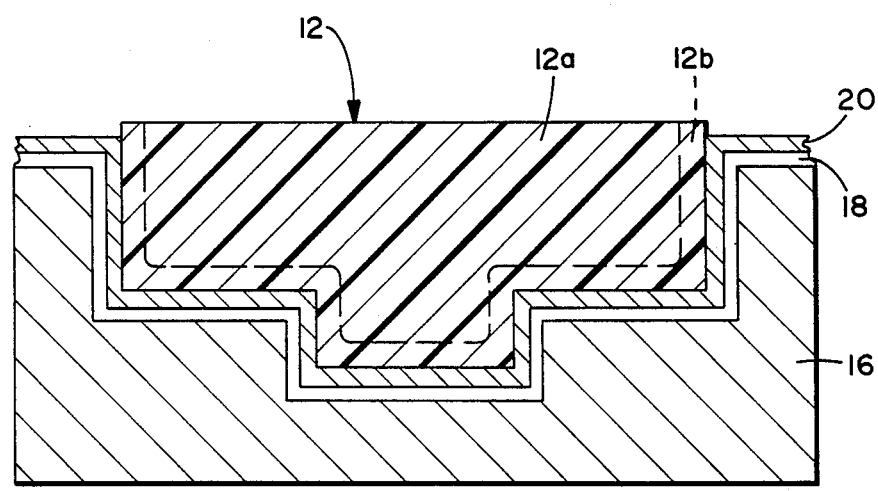
FIG. 2 is a cross-sectional view showing the alternative articles of FIG. 1 in the process of their production according to the present process.

As generally shown in FIG. 1, a shaped article 10 has a polymeric body 12, either solid as shown by 12a or shell-like as shown by 12b, and a surface layer 14 which is a particle-filled-resin composite. This surface-modified polymeric shaped article is prepared as is generally shown in FIG. 2. A mold or tool 16 is provided, generally from a metal such as steel, having the mirror image of the shape which is to be provided to the final article.

Mold 16 is then coated with a mold release agent layer 18 which serves to prevent adhesion of the shaped article to the mold during the process. Suitable materials useful as the mold release agent layer include silicone liquid or teflon sheet film. Preferably the mold release agent layer is thin, less than 10 mils, due to the necessity to maintain shaped article dimensions and surface finish.

Atop the mold release agent is placed metal cloth 20 which, after resin impregnation and curing, forms integrated or encapsulated surface layer 14 of the shaped article 10. The metal cloth is prepared by using polytetrafluorethylene (PTFE) as a polymeric binder material and mixing it with the desired matrix particulate material and then working it to produce fibrils of PTFE which entrap the matrix particulate material, as generally discussed in U.S. Pat. Nos. 3,864,124 and 4,194,040, which are incorporated herein by reference. The PTFE is generally in the range of about 1 to 25 percent by volume with the matrix particulate material being the balance of the metal cloth. The metal cloths commonly have a solids density of approximately 50 to 70 percent by volume. Typically, matrix particulate materials are chosen for their wear-resistant or corrosion-resistant properties and are generally metals. Examples of such metals include tungsten carbide, iron/nickel alloys, tungsten carbide-nickel alloys, tungsten-titanium carbide, titanium carbide, chromium carbide cobalt-base alloys, iron-base alloys, and the like.

Non-metallic matrix particulate materials which may be utilized herein include aluminum nitride ceramic for improved thermal conductivity, and ferrite materials for improved electromagnetic properties.

Preferably tungsten carbide or tungsten carbide-nickel alloys are used as the particulate materials. The fibrillated PTFE containing the particulate materials resembles a piece of cloth and thus is referred to as a "metal cloth" even though it is not a woven material. However it is also included within the scope of the present invention for the metal cloth to be a true metallic cloth provided that it is limp and has surface-conforming properties. The metal cloth generally has a thickness of about 5 to 75 mils and thus readily conforms to the shape of the mold. To produce articles by injection molding, the mold is completely filled with a thermosetting molding resin which will form the solid body 12a of the resultant shaped article. The thermosetting resins useful herein include epoxy resins such as aerospace grade Hercules 3501-6 or electronics grade Dow Quatrex 5010, bismaleimides such as Hexcel F650 as well as Compimide 795, and other resins having a curing point below about 400° F.

Preferably the resin is reinforced with graphite, glass fibers, glass cloth, or the like to form what is known as a "prepreg". Suitable prepregs are commercially available under the trade designations Hercules AS4/3501-6 or F650/7781.

In the practice of the injection molding method of the present invention the applied thermosetting resin is then heated under pressure sufficient to cause the resin to flow into the interstices in the metal cloth or impregnate the cloth out to the mold 16 and to take the desired shape of the resultant article to be formed. Generally, this will entail temperatures of about 80° to about 250° C., preferably about 150° to about 200° C., and pressures of about 80 to about 300 psi, preferably about 100 to about 150 psi. As a result of the heating and pressure, the resin is forced into the metal cloth to form a metallic-filled-resin composite layer which is a surface of the shaped article while at the same time integrally joined to the article.

The heating and pressure application, if utilized, may be performed by autoclave, thermal press, or injection molded processing.

The surface modified shaped article is then ready for further fabrication, if desired. The shaped article has an encapsulated composite surface stratum which is uniform both as to thickness and composition, while the internal physical characteristics of the article remain essentially the same as before the integration process.

According to another embodiment of the present invention, the present composite articles may be produced by thermal pressure means using thin pre-preg composites of the aforementioned types, pre-formed in desired shapes. As illustrated by means of broken lines in FIG. 1 and 2, the polymeric body 12 in such embodiment is a relatively thin prepreg shell 12b comprising thermosetting polymeric resin reinforced with graphite, glass fibers, glass cloth, or the like. A surface thereof is covered with the aformentioned metal cloth 20 and heat and pressure are applied to encapsulate the metal cloth within the adjacent surface of the prepreg shell 12b, as shown by 14 in FIG. 1, to form an integrated laminate.

The subject invention will now be described in greater detail in the following examples. These examples are set forth for the purpose of illustrating the invention and are not intended to limit the same. All parts and percents are by weight unless otherwise specified.

EXAMPLE I

A tool of 1018 steel having a complex shape is coated with a 5 mil layer of teflon sheet as a mold release agent. A coating material of tungsten carbide particles is mixed with PTFE in the ratio of 20:1 volume percent and worked to fibrillate the PTFE and trap the tungsten carbide particles therein, thus making a metal cloth as fully described in U.S. Pat. No. 3,743,556. The metal cloth is fabricated to have a solids density of approximately 56 percent by volume and a thickness of 0.044 inch.

The metal cloth is then cut to the shape of the tool, placed atop the mold release agent, and forced into the crevices of the mold 16. An AS-4 graphite fiber reinforced 3501-6 epoxy resin prepreg (AS4/3501-6 comercially-available from Hercules Company) is then placed atop the metal cloth. Sufficient quantity of the prepreg to form the designed shape, dimensions, and fiber orientations is utilized. The entire structure is then placed in an autoclave at 180 $^C$ for 240 minutes to allow the resin to remelt and flow into the interstices of the metal cloth and to cure.

The result is an extremely uniform 44 mil thick coating on the AS4/3501-6. The coating contains the fibrillated PTFE and the tungsten carbide particles. The balance of the shape contains AS4/3501-6 fiber-reinforced resin. The entire cloth thickness is encapsulated. No resin voids are noted in the article. The surface finish smoothly replicates the tool or mold finish.

EXAMPLE II

The procedure of Example I is repeated except that the tungsten carbide particles are replaced by tungsten carbide-nickel alloy particles. Substantially equivalent results are observed.

EXAMPLE III

The procedure of Example I is repeated except that the AS4/3501-6 prepreg is replaced by each of the following resins:
a. Quatrex 5010 (epoxy)
b. Hexcel F650 (BMI)
c. Compimide 795 (BMI)
d. Matrimid 5292 (BMI)

Substantially equivalent results are observed in each case.

EXAMPLE IV

The procedure of Example I is repeated except that the tungsten carbide particles are replaced by non-metallic particles of aluminum nitride and the AS4/3501-6 prepreg is replaced by a non-fiber reinforced epoxy resin. Substantially equivalent results are observed.

EXAMPLE V

The procedure of Example I is repeated except that in place of the autoclave, a thermal press is used and a pressure of 100 psi is imposed upon the prepreg surface by a heated tool. The heating is at 200° C. for only 120 minutes. Substantially equivalent results are observed.

Thus articles produced by the present invention have a dimensionally controlled, uniform surface layer with specifically desired properties. The method of production allows for manufacturing without the need for adhesives while providing excellent conformability to complex tool geometry.

While there have been described herein what are at present considered to be the preferred embodiments of this invention, it will be obvious to those skilled in the art that various changes and modifications may be made without departing from the invention, and it is, therefore, aimed in the appended claims to cover all such changes and modifications as fall within the true spirit and scope of the invention.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A method of modifying the surface properties of a shaped plastic article which comprises:
   (i) providing a release mold of the shaped article;
   (ii) applying atop the release mold a metal cloth which comprises fibrillate polytetrafluorethylene having particulate matter entrapped in the fibrils;
   (iii) placing a thermosetting polymeric resin atop the metal cloth; and
   (iv) heating the structure produced by (i)–(iii) for a sufficient period of time and at a sufficient temperature and pressure as to cause the resin to flow into and encapsulate in the metal cloth and cure to form the shaped article.

2. The method of claim 1 wherein the release mold is one which is coated with a release means.

3. The method of claim 1 wherein the particulate matter is a metal.

4. The method of claim 3 wherein the metal is selected from the group consisting of tungsten carbide, iron/nickel alloys, tungsten carbide-nickel alloys, tungsten-titanium carbide, titanium carbide, chromium carbide, cobalt-based alloys and iron-based alloys.

5. The method of claim 3 wherein the metal comprises tungsten carbide.

6. The method of claim 1 wherein the particulate matter is a non-metal.

7. The method of claim 6 wherein the non-metal is selected from the group consisting of refractory carbides, nitrides, and oxides.

8. The method of claim 1 wherein the resin is selected from the group consisting of epoxy resins, bismaleimides, and thermoplastics having a melting point below about 400° F.

9. The method of claim 8 wherein the resin is reinforced with fibrous material.

10. The method of claim 9 wherein the fibrous material is selected from the group consisting of carbon, glass, metal, and/or ceramic.

11. The method of claim 1 wherein the heating is at a temperature of about 80° to about 250° C.

12. The method of claim 1 wherein the pressure is from about 80 to about 300 psi.

13. The method of claim 1 wherein the release mold is coated with a release means comprising teflon sheet or silicone liquid; the particulate matter comprises tungsten carbide; the resin is selected from epoxy and polyimide resins; the heating is at a temperature of about 80 to about 250° C., a pressure of about 80 to 300 psi, for about 120 to about 240 minutes.

14. The method of claim 1 wherein the mold is inherently mold-releasable and no additional mold release means is used.

15. A method of forming a metallic-filled-resin composite surface on a shaped plastic article which comprises:
   (i) providing a release mold of the shaped article to be formed;
   (ii) applying atop the release mold a metal cloth which comprises fibrillated polytetrafluorethylene having metal particles entrapped in the fibrils;
   (iii) placing a thermosetting polymeric resin atop the metal cloth; and
   (iv) heating the structure produced by (i)–(iii) for a sufficient period of time and at a sufficient temperature and pressure as to cause the resin to flow into and encapsulate in the metal cloth and cure to form the shaped article.

16. The method of claim 15 wherein the release mold in one which is coated with a release means.

17. The method of claim 15 wherein the metal is selected from the group consisting of tungsten carbide, iron/nickel alloys, tungsten carbide-nickel alloys, tungsten-titanium carbide, titanium carbide, chromium carbide, cobalt-based alloys and iron-based alloys.

18. The method of claim 17 wherein the metal comprises tungsten carbide.

19. The method of claim 15 wherein the resin is selected from the group consisting of epoxy resins, polyimides and thermoplastic resins having a melting point below about 400° F.

20. The method of claim 19 wherein the resin is reinforced with fibrous material.

21. The method of claim 20 wherein the fibrous material is selected from the group consisting of carbon, glass, metal, and/or ceramic.

22. The method of claim 15 wherein the release mold is coated with a release means comprising teflon sheets or silicon liquid; the particulate matter comprises tungsten carbide; the resin is selected from epoxy and bismaleimide resins; the heating is at a temperature of about 80 to about 250° C., a pressure of about 80 to 300 psi, for about 120 to about 240 minutes.

23. The method of claim 15 wherein the mold is inherently mold-releasable and no additional mold release means is used.

24. A molded, shaped plastic article having an integral metal-filled-resin composite surface, comprising a molded body of a thermoset polymeric resin having an integral surface portion comprising a fibrillated polytetrafluorethylene metal cloth having particulate matter entrapped in the fibrils thereof, said metal cloth being integrated with said polymeric resin during the molding of said plastic article under sufficient heat and pressure to cure said polymeric resin.

25. The article of claim 24 wherein the particulate matter comprises metal particles.

26. The article of claim 25 wherein the metal is selected from the group consisting of tungsten carbide, iron/nickel alloys, tungsten carbide-nickel alloys, tungsten-titanium carbide, titanium carbide, chromium carbide, cobalt-based alloys and iron-based alloys.

27. The article of claim 25 wherein the metal comprises tungsten carbide.

28. The article of claim 23 wherein the particulate matter comprises a non-metal.

29. The article of claim 28 wherein the non-metal is selected from the group consisting of refractory carbides, nitrides, and oxides.

30. The article of claim 24 wherein the resin is selected from the group consisting of epoxy resins, bismaleimides, and resins having a melting point below about 400° F.

31. The article of claim 30 wherein the resin is reinforced with fibrous material.

32. The article of claim 31 wherein the fibrous material is selected from the group consisting of carbon, glass, metal, and/or ceramic.

* * * * *